United States Patent
Boaz et al.

[11] Patent Number: 5,827,345
[45] Date of Patent: Oct. 27, 1998

[54] METHOD FOR HEATING, FORMING AND TEMPERING A GLASS SHEET

[75] Inventors: Premakaran Tucker Boaz, Livonia; Gary W. Sitzman, Walled Lake, both of Mich.

[73] Assignee: Ford Global Technologies, Inc., Dearborn, Mich.

[21] Appl. No.: 969,090

[22] Filed: Nov. 12, 1997

Related U.S. Application Data

[63] Continuation of Ser. No. 524,493, Sep. 7, 1995, abandoned.

[51] Int. Cl.⁶ ............................. C03B 23/02; C03B 27/00
[52] U.S. Cl. ................................ 65/104; 65/106; 65/111; 65/114; 219/678; 219/680
[58] Field of Search ............................. 65/102, 104, 106, 65/107, 111, 114; 219/678, 680, 764, 773; 264/432, 489; 432/1, 9, 11, 18

[56] References Cited

U.S. PATENT DOCUMENTS

| | | |
|---|---|---|
| 2,145,119 | 1/1939 | Littleton . |
| 2,178,520 | 10/1939 | Howard . |
| 2,223,124 | 11/1940 | Owen . |
| 3,406,022 | 10/1968 | Gehenot . |
| 3,545,951 | 12/1970 | Nedelec . |
| 3,875,766 | 4/1975 | French . |
| 3,938,980 | 2/1976 | French . |
| 4,065,284 | 12/1977 | Mang et al. . |
| 4,100,386 | 7/1978 | Bardet . |
| 4,226,608 | 10/1980 | McKelvey . |
| 4,606,748 | 8/1986 | Blake et al. . |
| 4,773,925 | 9/1988 | Schultz . |
| 4,838,915 | 6/1989 | Hässler . |
| 5,306,324 | 4/1994 | Vehmas et al. . |
| 5,324,345 | 6/1994 | Rutjes et al. . |
| 5,352,263 | 10/1994 | Kuster et al. . |
| 5,656,053 | 8/1997 | Boaz ........................................ 65/106 |

FOREIGN PATENT DOCUMENTS

| | | |
|---|---|---|
| 0000269 | 1/1979 | European Pat. Off. . |
| 0363097 | 4/1990 | European Pat. Off. . |
| 0476693 | 3/1992 | European Pat. Off. . |
| 0546617 | 6/1993 | European Pat. Off. . |
| 686549 | 1/1940 | Germany . |
| 707141 | 6/1941 | Germany . |
| 1680646 | of 1989 | U.S.S.R. . |
| WO93/06052 | 4/1993 | WIPO . |

OTHER PUBLICATIONS

Robert Gardon, "The Tempering of Flat Glass By Forced Convection", pp. 1–33.

Robert Gardon, "Calculation of Temperature Distributions in Glass Plates Undergoing Heat–Treatment", Jun. 1958, pp. 200–209.

*Primary Examiner*—Steven P. Griffin
*Attorney, Agent, or Firm*—Lorraine S. Melotik, Esq.; Roger L. May, Esq.

[57] ABSTRACT

A method for heating, forming and tempering a glass sheet including the steps of heating at least one glass sheet to at least a first predetermined temperature, applying microwave energy to the glass sheet to heat the glass sheet to at least a second predetermined temperature, forming the glass sheet to a predetermined configuration, and cooling an outer surface of the glass sheet to at least a third predetermined temperature to temper the glass sheet.

16 Claims, 1 Drawing Sheet

METHOD FOR HEATING, FORMING AND TEMPERING A GLASS SHEET

This is a continuation of U.S. patent application Ser. No. 08/524,493, filed Sep. 7, 1995, now abandoned.

GOVERNMENT RIGHTS IN INVENTION

The U.S. Government has rights in the present invention as provided for by the terms of Contract No. IPO-95-10043-003 awarded by the Department of Energy.

CROSS-REFERENCES TO RELATED APPLICATIONS

The present application is related to Ser. No. 08/524,500, filed Sep. 7, 1995, now abandoned and entitled "METHOD FOR HEATING A GLASS SHEET" and Ser. No. 08/524,495, filed Sep. 7, 1994, now U.S. Pat. No. 5,656,053 and entitled "METHOD FOR HEATING AND FORMING A GLASS SHEET".

BACKGROUND OF THE INVENTION

1. Field of the Invention

The present invention relates generally to glass sheets and, more specifically, to a method for heating, forming and tempering a glass sheet.

2. Description of the Related Art

It is known to heat glass sheets using a "hearth" or "lehr". Generally, the lehr is a furnace and may be of a continuous roller-type, fixtured roller-type or gas-type. For example, a gas-type lehr has a plurality of blocks disposed beneath a plurality of radiant heaters. Typically, a glass sheet is placed inside the lehr where it is heated by conventional radiation, convection and conduction heat. The glass sheet is moved along the blocks at a predetermined rate which depends on the thermal conductivity of the glass sheet to reach a temperature in its forming range. When the glass sheet is at a temperature in its forming range, the glass sheet is formed to a predetermined shape of the blocks. Once formed, the glass sheet is tempered using a thermal quench system.

Although the above lehr and thermal quench system have worked well to heat and temper a glass sheet, they suffer from the disadvantage that the lehr must be long in length to allow the glass sheet to be heated at a predetermined rate. They also suffer from the disadvantage that only relatively thick glass sheets (e.g. 0.1563 inches) can be tempered due to temperature loss between heating and cooling cycles. Further, they suffer from the disadvantage that the glass sheet may not be formed to a desired shape and tempered at the same time. As a result, there is a need in the art to heat a glass sheet quickly in a controlled manner and allow for tempering of relatively thin glass sheets.

SUMMARY OF THE INVENTION

Accordingly, the present invention is a method for heating, forming and tempering a glass sheet. The method includes the steps of heating at least one glass sheet to at least a first predetermined temperature, applying microwave energy to the glass sheet to heat the glass sheet to at least a second predetermined temperature and forming the glass sheet to a predetermined configuration. The method also includes the steps of cooling an outer surface of the glass sheet to at least a third predetermined temperature to temper the glass sheet.

One advantage of the present invention is that an improved method is provided for heating, forming and tempering a glass sheet. Another advantage of the present invention is that the method uses microwave energy to heat the glass sheet quickly. Yet another advantage of the present invention is that the method uses a fixture to form the glass sheet to a desired curvature. Still another advantage of the present invention is that the method allows for shaping or forming the glass sheet while simultaneously tempering the glass sheet. A further advantage of the present invention is that the method allows for tempering of relatively thin glass sheets.

Other features and advantages of the present invention will be readily appreciated as the same becomes better understood after reading the subsequent description when taken in conjunction with the accompanying drawings.

DESCRIPTION OF THE PREFERRED EMBODIMENT(S)

Figure 1:
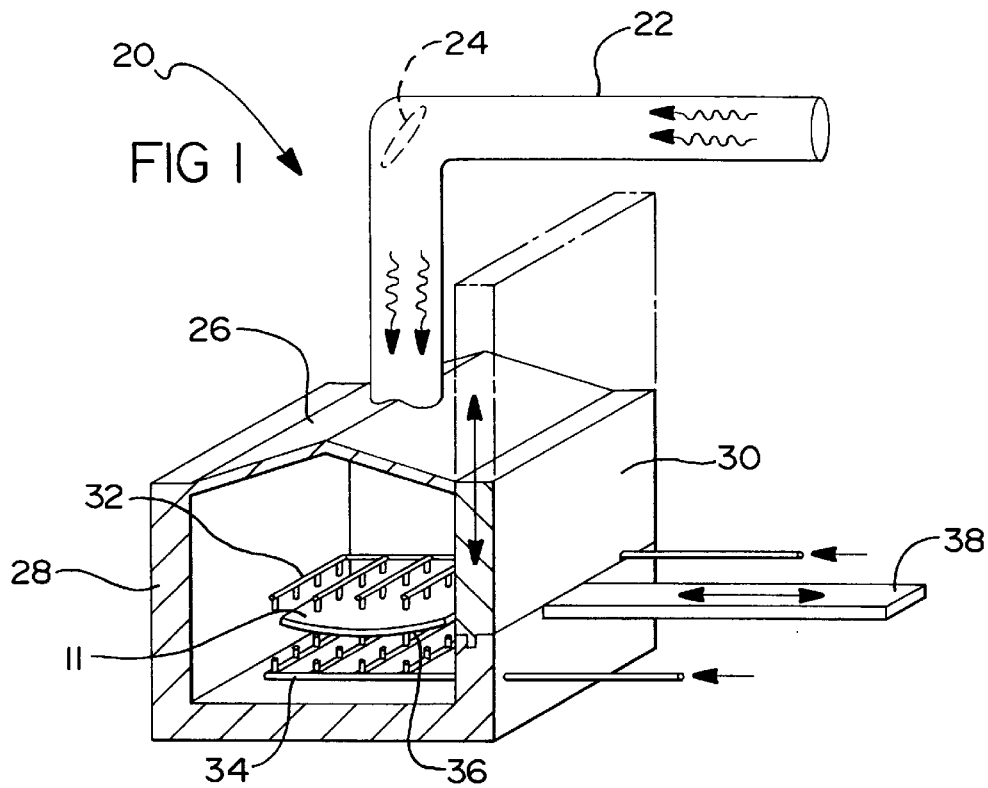
FIG. 1 is a fragmentary perspective view of a microwave energy apparatus used in conjunction with a method for heating, forming and tempering a glass sheet, according to the present invention.

Referring to the drawings and in particular to FIG. 1, one embodiment of a microwave energy apparatus 20 for use in conjunction with a method for heating, forming and tempering a glass templet or sheet 11, according to the present invention, is shown. The microwave energy apparatus 20, partially shown, includes a conduit 22 extending longitudinally and having a reflector 24 in a corner thereof to direct microwave energy through a downward portion of the conduit 22. The microwave energy apparatus 20 includes a shield 26 at one end of the conduit 22 to columnate the microwave energy and form a transverse curtain of microwave energy (e.g. six inches). The microwave energy apparatus 20 also includes a housing 28 having an uplift door 30 on one longitudinal end to allow entry and exit of the glass sheet 11 into a contained area for the microwave energy. The microwave energy apparatus 20 is a self-contained unit having a microwave energy frequency of two (2) to forty (40) gigahertz. Preferably, the frequency of the microwave energy is less than thirty-six (36) gigahertz. The microwave energy apparatus 20 further includes air blowers 32 and 34 above and below the glass sheet 11 in the contained area of the apparatus 20. The air blowers 32 and 34 are arranged in four rows to direct cooling air from a source (not shown) toward the glass sheet 11. It should be appreciated that the microwave energy apparatus 20 is a Gyrotron type commercially available from Continental Electronics of Dallas, Tex.

Figure 2:
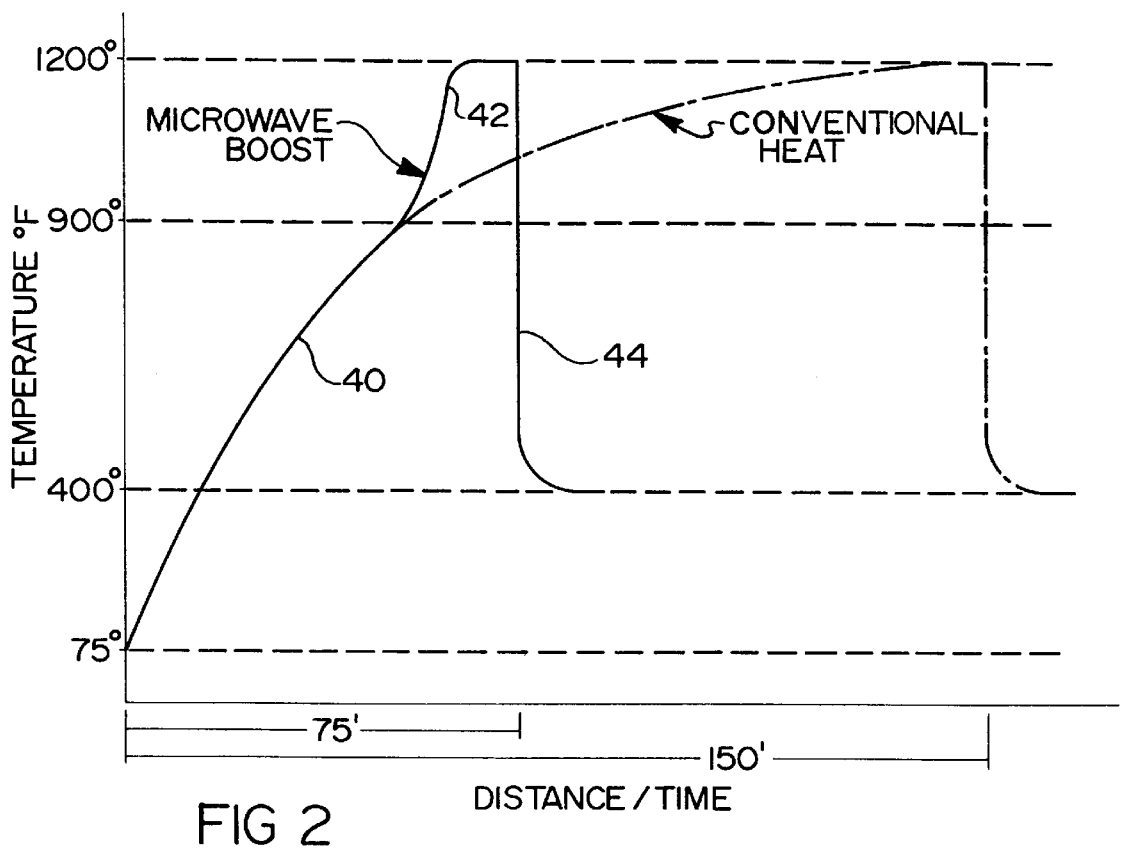
FIG. 2 is a graph of temperature versus rate of a glass sheet heated by a method for heating, forming and tempering a glass sheet, according to the present invention.

In operation, the microwave energy apparatus 20 may be used to form a windshield for a motor vehicle (not shown) by a method, according to the present invention. The method includes placing at least one, preferably a pair of flat or planar glass sheets 11 on a fixture 36 at one end of the apparatus 20. The method includes heating the glass sheets 11 to a predetermined temperature. In one embodiment, the predetermined temperature is the softening point of the glass sheet 11 which is approximately 900° F. to 950° F. As illustrated in FIG. 2, a curve 40 represents the temperature of the glass sheet 11 over distance/time as is known in the art. It should be appreciated that the glass sheet 11 is preheated to the predetermined temperature by conventional methods and apparatuses such as a lehr.

When the glass sheet 11 is at its softening point, the method includes moving the fixture 36 and glass sheet 11 within the contained area by opening the uplift door 30 and displacing an arm 38 (partially shown) holding the fixture 36 inwardly into the contained area and closing the uplift door 30. The method includes applying microwave energy to the glass sheet 11 when the glass sheet 11 is at or above its softening point as represented by the curve 42 illustrated in FIG. 2. It should be appreciated that if the glass sheet 11 is below its softening point, the microwave energy may break the glass sheet 11. It should also be appreciated that the contained area within the microwave energy apparatus 20 is kept at an ambient temperature of approximately 1250° F. by suitable means such as radiant heaters (not shown).

The method includes applying the microwave energy to the glass sheet 11 over a predetermined time by a curtain of the microwave energy columnated by the shield 26 and rapidly heating the glass sheet 11 with the microwave energy to a predetermined temperature. In one embodiment:, the predetermined temperature of the glass sheet 11 is its forming range of approximately 1150° F. to 1250° F. For example, the temperature of the glass sheet 11 can be raised from 900° F. to over 1200° F. in less than ten (10) seconds as illustrated in FIG. 2. The microwave energy heats the glass sheet 11 directly by generating heat at the molecular level by creating polar orientation movement very rapidly resulting in instantaneous and uniform heating through the thickness of the glass sheet 11. It should be appreciated that microwave frequencies as low as two gigahertz can be used when the glass sheet 11 is above 900° F.

When the glass sheet 11 is at a temperature in its forming range, the method includes forming the glass sheet 11 to a predetermined configuration or curvature. The weight of the glass sheets 11 causes the glass sheets 11 to sag or bend to the curvature of the fixture 36. The method also includes cooling an outer surface of the glass sheet 11 to at least a third predetermined temperature which is below approximately 1200° F. simultaneously while applying the microwave energy. For example, air is blown at the glass sheet 11 by the air blowers 32 and 34 to give the glass sheet 11 a cool hard skin or outer surfaces. When the temperature of the outer surface of the glass sheet 11 goes below 1200° F., the microwave energy is turned off to complete tempering of the glass sheet 11. The method includes cooling the glass sheet 11 with cool air to below its softening point as represented by the curve 44 illustrated in FIG. 2. When the temperature of the glass sheets 11 is below 400° F., the glass sheets 11 and fixture 36 are removed from the apparatus 20 and the glass sheets 11 are further cooled to room temperature. It should be appreciated that the cooling air is applied while still applying the microwave energy to create a high level temperature gradient through the thickness of the glass sheet 11 regardless of the thickness of the glass sheet 11. It should also be appreciated that the method can be used to temper relatively thin glass sheets 11 (e.g. less than 0.125 inches). It should further be appreciated that a temperature measuring device is used to measure the temperature of the glass sheet 11 which is conventional and known in the art.

Accordingly, the method of the present invention provides a way to quickly heat the glass sheet 11 by providing a curtain of microwave energy over the glass sheet 11. The microwave energy is applied based on the size and thickness of the glass sheet 11 to bring the temperature of the glass sheet 11 up to its forming range for forming the glass sheet while simultaneously tempering the glass sheet. As illustrated in FIG. 2, the method of the present invention heats the glass sheet 11 to the forming range in less distance/time than conventional radiant heating in a lehr.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for heating, forming and tempering a glass sheet, said method comprising the steps of:

placing at least one glass sheet on a fixture having a predetermined curvature;

heating the at least one glass sheet to at least a first predetermined temperature;

columnating microwave energy;

applying a curtain of the columnated microwave energy having a frequency of two to forty gigahertz to the at least one glass sheet to heat the at least one glass sheet to at least a second predetermined temperature greater than said first predetermined temperature;

forming the at least one glass sheet to the predetermined curvature of the fixture; and cooling an outer surface of the at least one glass sheet to at least a third predetermined temperature to temper the at least one glass sheet.

2. A method as set forth in claim 1 wherein said first predetermined temperature is approximately 900° F.

3. A method as set forth in claim 1 wherein said step of applying comprises applying said curtain of the columnated microwave energy to the at least one glass sheet when the at least one glass sheet has reached at least the first predetermined temperature.

4. A method as set forth in claim 1 wherein said step of applying comprises applying said curtain of the columnated microwave energy to the at least one glass sheet over a predetermined time.

5. A method as set forth in claim 1 wherein said second predetermined temperature is approximately 1150° F. to 1250° F.

6. A method as set forth in claim 1 wherein said step of cooling comprises cooling said outer surface of the at least one glass sheet simultaneously with said step of applying.

7. A method as set forth in claim 1 wherein said third predetermined temperature is below approximately 1200° F.

8. A method as set forth in claim 1 wherein said step of forming comprises bending the at least one glass sheet to the predetermined curvature of the fixture.

9. A method for heating, forming and tempering a glass sheet, said method comprising the steps of:

placing at least one glass sheet on a fixture having a predetermined curvature;

heating the at least one glass sheet to at least a first predetermined temperature;

columnating microwave energy;

applying a curtain of the columnated microwave energy having a frequency of two to forty gigahertz to the at least one glass sheet to heat the at least one glass sheet to at least a second predetermined temperature greater than said first predetermined temperature;

forming the at least one glass sheet to the predetermined curvature of the fixture; and cooling an outer surface of the at least one glass sheet to at least a third predetermined temperature during said step of applying to temper the at least one glass sheet.

10. A method as set forth in claim 9 wherein said first predetermined temperature is approximately 900° F.

11. A method as set forth in claim 9 wherein said step of applying comprises applying said curtain of the columnated microwave energy to the at least one glass sheet when the at least one glass sheet has reached at least the first predetermined temperature.

12. A method as set forth in claim 9 wherein said step of applying comprises applying said curtain of the columnated microwave energy to the at least one glass sheet over a predetermined time.

13. A method as set forth in claim 9 wherein said second predetermined temperature is approximately 1150° F. to 1250° F.

14. A method as set forth in claim 9 wherein said third predetermined temperature is below approximately 1200° F.

15. A method as set forth in claim 9 wherein said step of forming comprises bending the glass sheet to the predetermined curvature of the fixture.

16. A method for heating, forming and tempering a glass sheet, said method comprising the steps of:

placing at least one glass sheet on a fixture having a predetermined curvature;

heating the at least one glass sheet to at least a first predetermined temperature;

columnating microwave energy;

applying a curtain of the columnated microwave energy having a frequency of two to forty gigahertz to the at least one glass sheet over a predetermined time to heat the at least one glass sheet to at least a second predetermined temperature greater than said first predetermined temperature;

forming the at least one glass sheet to the predetermined curvature of the fixture; and cooling an outer surface of the at least one glass sheet to at least a third predetermined temperature during said step of applying to temper the at least one glass sheet.

* * * * *